United States Patent [19]
Simpson

[11] Patent Number: 6,155,589
[45] Date of Patent: Dec. 5, 2000

[54] TRAILER HITCH LOCKING ASSEMBLY

[76] Inventor: Ricky Simpson, 66 Horseshoe Bend Rd., Leoma, Tenn. 38468

[21] Appl. No.: 09/244,403

[22] Filed: Feb. 4, 1999

[51] Int. Cl.[7] .................................................. B60D 1/173
[52] U.S. Cl. ........................................... 280/507; 280/511
[58] Field of Search ..................................... 280/507, 511

[56] References Cited

U.S. PATENT DOCUMENTS

| | | | |
|---|---|---|---|
| 3,841,664 | 10/1974 | Anderson | 280/507 |
| 3,866,949 | 2/1975 | Green | 280/507 |
| 4,032,171 | 6/1977 | Allen et al. | 280/507 |
| 4,781,394 | 11/1988 | Schwarz et al. | 280/507 |
| 4,836,570 | 6/1989 | Lopez et al. | 280/507 |
| 5,584,495 | 12/1996 | Mason | 280/507 |
| 5,947,506 | 9/1999 | Bauer | 280/507 |

*Primary Examiner*—Kevin Hurley
*Assistant Examiner*—Andrew J. Fischer

[57] ABSTRACT

A trailer hitch locking assembly for locking a trailer hitch to a vehicle to prevent theft. The trailer hitch locking assembly includes a plate member with front and back sides and a pair of opposite ends. The plate member is positionable over a hitch ball coupled to a rear bumper of a vehicle. The plate member has a pair of apertures extending through it. The apertures of the plate member are alignable with holes extending through the rear bumper. A pair of threaded fasteners extend through the apertures of the plate member and the holes of the rear bumper. A pair of nuts are threadedly coupled to the threaded fasteners.

19 Claims, 2 Drawing Sheets

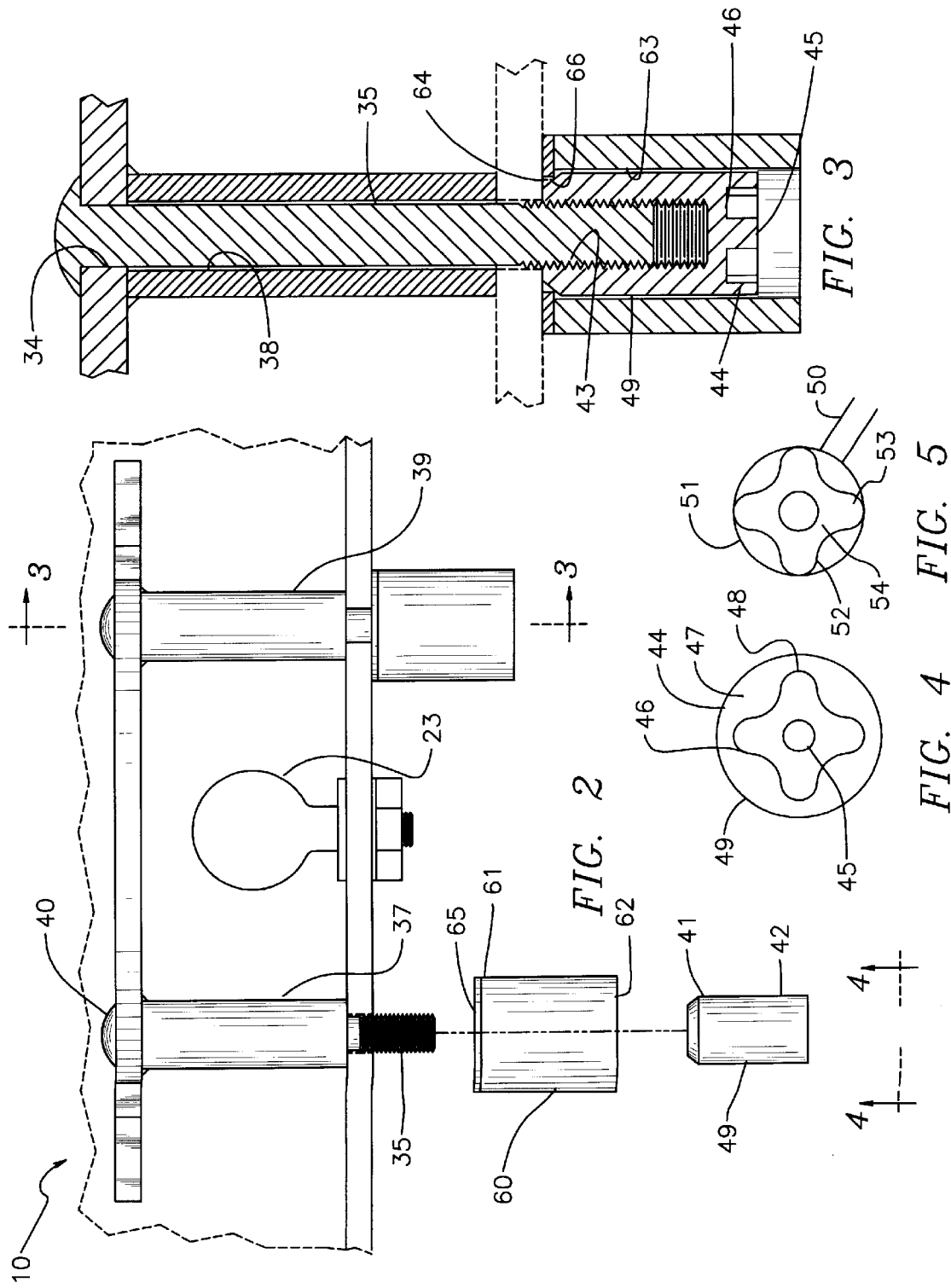

TRAILER HITCH LOCKING ASSEMBLY

BACKGROUND OF THE INVENTION

1. Field of the Invention

The present invention relates to locking mechanisms for trailer hitches and more particularly pertains to a new trailer hitch locking assembly for locking a trailer hitch to a vehicle to prevent theft.

2. Description of the Prior Art

The use of locking mechanisms for trailer hitches is known in the prior art. More specifically, locking mechanisms for trailer hitches heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,584,495; U.S. Pat. No. 5,087,064; U.S. Pat. No. 4,208,065; U.S. Pat. No. 2,969,993; U.S. Pat. No. 2,671,675; and U.S. Pat. No. Des. 368,059.

While these devices fulfill their respective, particular objectives and requirements, the aforementioned patents do not disclose a new trailer hitch locking assembly. The inventive device includes a plate member with front and back sides and a pair of opposite ends. The plate member is positionable over a hitch ball coupled to a rear bumper of a vehicle. The plate member has a pair of apertures extending through it. The apertures of the plate member are alignable with holes extending through the rear bumper. A pair of threaded fasteners extend through the apertures of the plate member and the holes of the rear bumper. A pair of nuts are threadedly coupled to the threaded fasteners.

In these respects, the trailer hitch locking assembly according to the present invention substantially departs from the conventional concepts and designs of the prior art, and in so doing provides an apparatus primarily developed for the purpose of locking a trailer hitch to a vehicle to prevent theft.

SUMMARY OF THE INVENTION

In view of the foregoing disadvantages inherent in the known types of locking mechanisms for trailer hitches now present in the prior art, the present invention provides a new trailer hitch locking assembly construction wherein the same can be utilized for locking a trailer hitch to a vehicle to prevent theft.

The general purpose of the present invention, which will be described subsequently in greater detail, is to provide a new trailer hitch locking assembly apparatus and method which has many of the advantages of the locking mechanisms for trailer hitches mentioned heretofore and many novel features that result in a new trailer hitch locking assembly which is not anticipated, rendered obvious, suggested, or even implied by any of the prior art locking mechanisms for trailer hitches, either alone or in any combination thereof.

To attain this, the present invention generally comprises a plate member with front and back sides and a pair of opposite ends. The plate member is positionable over a hitch ball coupled to a rear bumper of a vehicle. The plate member has a pair of apertures extending through it. The apertures of the plate member are alignable with holes extending through the rear bumper. A pair of threaded fasteners extend through the apertures of the plate member and the holes of the rear bumper. A pair of nuts are threadedly coupled to the threaded fasteners.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new trailer hitch locking assembly apparatus and method which has many of the advantages of the locking mechanisms for trailer hitches mentioned heretofore and many novel features that result in a new trailer hitch locking assembly which is not anticipated, rendered obvious, suggested, or even implied by any of the prior art locking mechanisms for trailer hitches, either alone or in any combination thereof.

It is another object of the present invention to provide a new trailer hitch locking assembly which may be easily and efficiently manufactured and marketed.

It is a further object of the present invention to provide a new trailer hitch locking assembly which is of a durable and reliable construction.

An even further object of the present invention is to provide a new trailer hitch locking assembly which is susceptible of a low cost of manufacture with regard to both materials and labor, and which accordingly is then susceptible of low prices of sale to the consuming public, thereby making such trailer hitch locking assembly economically available to the buying public.

Still yet another object of the present invention is to provide a new trailer hitch locking assembly which provides in the apparatuses and methods of the prior art some of the advantages thereof, while simultaneously overcoming some of the disadvantages normally associated therewith.

Still another object of the present invention is to provide a new trailer hitch locking assembly for locking a trailer hitch to a vehicle to prevent theft.

Yet another object of the present invention is to provide a new trailer hitch locking assembly which includes a plate member with front and back sides and a pair of opposite ends. The plate member is positionable over a hitch ball coupled to a rear bumper of a vehicle. The plate member has a pair of apertures extending through it. The apertures of the plate member are alignable with holes extending through the rear bumper. A pair of threaded fasteners extend through the apertures of the plate member and the holes of the rear bumper. A pair of nuts are threadedly coupled to the threaded fasteners.

Still yet another object of the present invention is to provide a new trailer hitch locking assembly that reduces the chance that a trailer hitch will come loose from a ball while driving.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic exploded view of the present invention.

FIG. 3 is a schematic cross-sectional view of the present invention taken along line 3—3 of FIG. 2.

FIG. 4 is a schematic side view of the present invention taken from line 4—4 of FIG. 2.

FIG. 5 is a schematic side view of the a tool of the present invention.

DESCRIPTION OF THE PREFERRED EMBODIMENT

Figure 1:
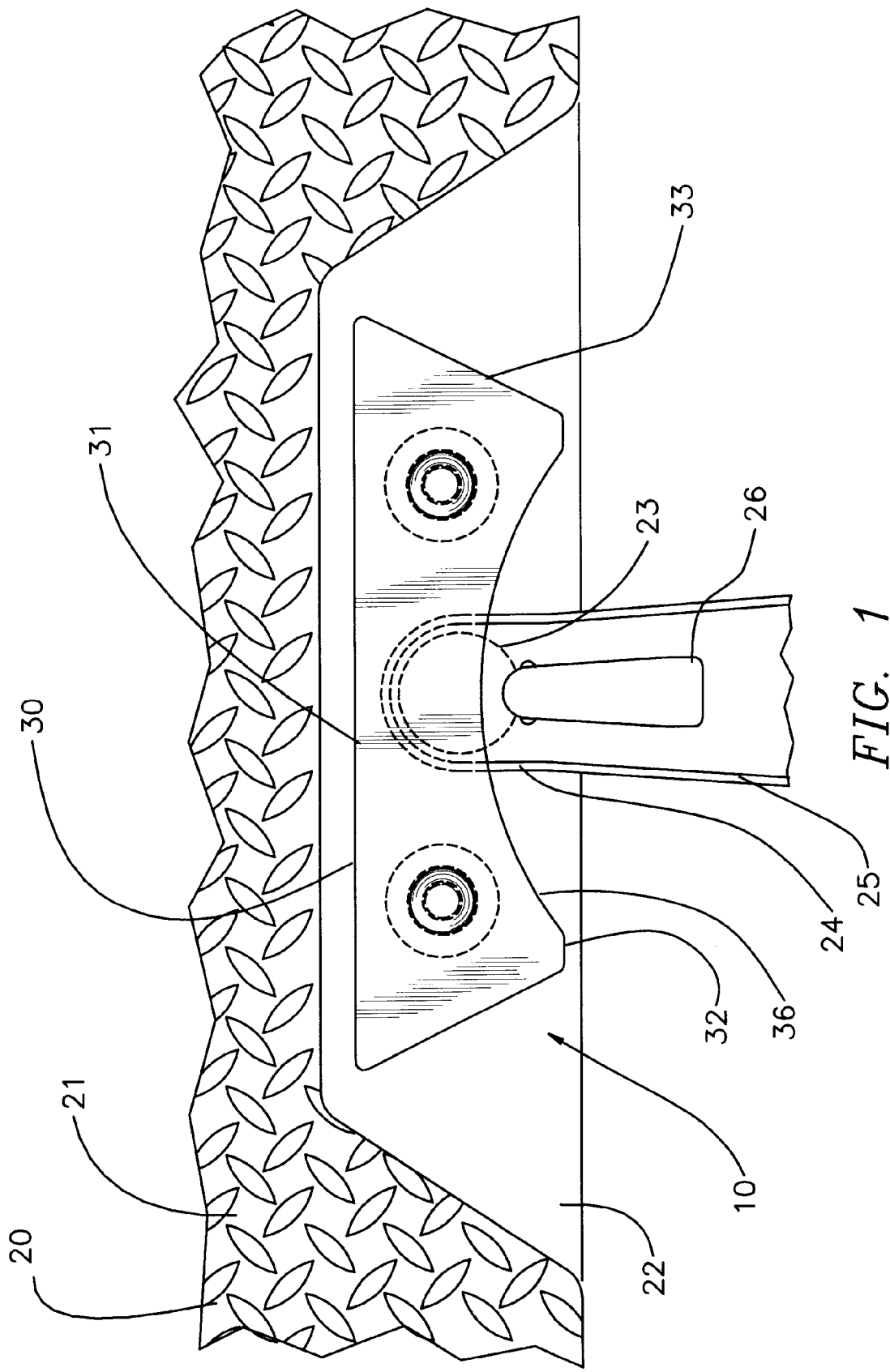
FIG. 1 is a schematic top view of a new trailer hitch locking assembly according to the present invention.

With reference now to the drawings, and in particular to FIGS. 1 through 5 thereof, a new trailer hitch locking assembly embodying the principles and concepts of the present invention and generally designated by the reference numeral 10 will be described.

As best illustrated in FIGS. 1 through 5, the trailer hitch locking assembly 10 is adapted for coupling to a rear bumper 20 of a vehicle 21. The rear bumper has a generally planar hitch receiving panel 22 and a hitch ball 23 extending from the hitch receiving panel. The trailer hitch locking assembly generally comprises a plate member 30 with front and back sides 31,32 and a pair of opposite ends 33. The plate member is positionable over the hitch ball coupled to the rear bumper of the vehicle. The plate member has a pair of apertures 34 extending through it. The apertures of the plate member are alignable with holes extending through the rear bumper. A pair of fasteners extend through the apertures of the plate member and the holes of the rear bumper. Preferably, the fasteners comprise threaded fasteners 35, but may also include other types of fasteners. If threaded fasteners are used, pair of nuts are threadedly coupled to the threaded fasteners.

Preferably, the front side of the plate member is substantially straight. Also preferably, the back side of the plate member has an arcuate shallow depression 36 therein for permitting free movement of the ball lock of the trailer hitch as the trailer hitch pivots in all directions. The shallow depression extends between the ends of the plate member.

Preferably, the ends of the plate member taper together from the back side towards the front side of the plate member for permitting a foot to slide therealong for standing on the hitch receiving panel of the rear bumper.

Also preferably, the plate member has a pair of cylindrical support members 37 extending downwardly from it to support the plate member over the ball hitch such that the plate member will nearly engage a trailer hitch coupled to the hitch ball. The support members also serve to help prevent cutting of the threaded fasteners.

Each of the support members has a lumen 38. The lumens of the support members are aligned with the apertures of the plate member. Free ends 39 of the support members rest on the hitch receiving panel of the rear bumper. The threaded fasteners extend through the apertures of the plate member, the lumens of the support members, and the holes of the rear bumper. Ideally, each of the threaded fasteners has a rounded top 40 so that it cannot easily be grasped by a tool and turned.

As shown in FIG. 3, a pair of lug nuts 49 are threadedly coupled to the threaded fasteners for holding the plate member in place. Preferably, each of the lug nuts has proximal and distal ends 41,42. A longitudinal axis extends between the proximal and distal ends. A threaded aperture 43 extends into the proximal end of each of the lug nuts. The threaded fasteners are threadedly received in the threaded apertures of the lug nuts.

Ideally, each of the lug nuts has a generally annular peripheral flange 44 extending outwardly of the distal end of the lug nut generally parallel the longitudinal axis of the lug nut. A generally circular protuberance 45 extends centrally from the distal end of the lug nut. The peripheral flange and the protuberance of each of the lug nuts forms a generally annular channel 46 therebetween which receives a tool 50 to rotate the lug nut, which will be discussed below. Most ideally, each of the peripheral flanges of the lug nuts has a plurality of alternating wide and narrow portions 47,48.

The tool which rotates the lug nuts has a head 51 with a generally annular lug engaging portion 52 adapted for insertion in the channels of the lug nuts. The lug engaging portion of the head of the tool has a plurality of alternating thick and thin portions 52,53 corresponding to the narrow and wide portions of the peripheral flanges of the lug nuts so that when the tool is inserted in the channels of the lug nuts, the corresponding thick portions of the tool, which are aligned with the narrow portions of the lug nuts, will abut the inner surfaces of the peripheral flanges to rotate the lug nuts.

Preferably, a pair of cylindrical sleeves 60 each having open top and bottom ends 61,62 and a lumen 63 are positioned on an opposite side of the hitch receiving panel of the rear bumper with respect to the support members. The lumens of the sleeves are aligned with the apertures of the plate member. The lug nuts are rotatably inserted in the sleeves.

Ideally, the top ends of each of the sleeves has an annular flange 64 extending inwardly therefrom which may be formed by fastening washers 65 to the top ends of the sleeves. In such an embodiment, the washers would have a central aperture 66 with an inner diameter smaller than the inner diameter of the lumen of each of the sleeves. The proximal ends of the lug nuts engage the annular flanges of the sleeves such that the sleeves are pinned to the rear bumper by the lug nuts.

Preferably, the proximal ends of each of the lug nuts taper together towards the proximal end of the lug nut for aligning the annular flanges of the sleeves with the lug nuts.

A length of each of the sleeves is defined between its top and bottom ends. A length of each of the lug nuts is defined between its proximal and distal ends. Preferably, the length of each of the sleeves is greater than the length of each of the lug nuts to prevent turning of the lug nuts without inserting the special tool into the channel of the lug nuts. In such an embodiment, an outer diameter of the tool is smaller than the inner diameter of the lumens of the sleeves so that the head of the tool may be inserted in the sleeves to access the lug nuts.

The preferred length of the steel plate between the outermost tips of the ends is between about 8 and 14 inches long, ideally about 11 inches. The preferred width of the plate member between the front and back sides is between about 1 and 5 inches wide, ideally about 3 inches wide. The preferred thickness of the plate member between its upper and lower sides is between about ¼ and ½ inch, ideally about ⅜ inch.

The preferred distance between the holes of the hitch receiving panel of the rear bumper is between about 4 and 8 inches, ideally about 6 inches. This range permits maximum horizontal pivoting of the hitch without striking the support members.

Exemplary dimensions of the threaded fasteners are about 4½ inches long along their longitudinal axis with about ½ inch diameter.

The preferred length of each of the support members along their longitudinal axes is about 3 inches and have about a 1 inch outer diameter.

The preferred length of the sleeves along their longitudinal axes is about 2 inches and have about a 1⅝ inch outer diameter. The preferred inner diameter of the annular flange is about ¾ inch.

In use, a ball housing 24 of a trailer hitch 25 is coupled to the hitch ball and the ball lock 26 of the trailer hitch is locked. The plate member is placed over the trailer hitch with the shallow depression of the plate member facing away from the vehicle. The threaded fasteners are inserted through the apertures of the plate member and the holes of the rear bumper. The sleeves are placed over the free ends of the threaded fasteners. The lug nuts are inserted in the sleeves and the tool is used to tighten the lug nuts.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trailer hitch locking system adapted for coupling to a rear bumper of a vehicle having a generally planar hitch receiving panel and a hitch ball extending from said hitch receiving panel, comprising:

a plate member having front and back sides and a pair of opposite ends, said plate member being positionable over a hitch ball coupled to a rear bumper of a vehicle;

said plate member having a pair of apertures extending therethrough, said apertures of said plate member being alignable with holes extending through a rear bumper of a vehicle;

a pair of fasteners for extending through said apertures of said plate member and said holes of said rear bumper; and wherein said plate member having a pair of generally cylindrical support members extending downwardly therefrom for supporting said plate member over said ball hitch, each of said support members having a lumen, said lumens of said support members being aligned with said apertures of said plate member, free ends of said support members resting on said hitch receiving panel of said rear bumper, said fasteners extending through said lumens of said support members.

2. The trailer hitch locking system of claim 1, wherein said back side of said plate member has an arcuate shallow depression therein for permitting free movement of said ball lock of said trailer hitch as said trailer hitch pivots, said shallow depression extending between said ends of said plate member.

3. The trailer hitch locking system of claim 1, wherein said ends of said plate member taper together from said back side towards said front side of said plate member for permitting a foot to slide therealong for standing on a hitch receiving panel of said rear bumper.

4. The trailer hitch locking system of claim 1, wherein each of said fasteners has a rounded top.

5. The trailer hitch locking system of claim 1, wherein each of said threaded fasteners comprises a threaded fastener, a pair of lug nuts being threadedly coupled to said threaded fasteners, each of said lug nuts having proximal and distal ends, a longitudinal axis extending between said proximal and distal ends, and a threaded aperture extending into said proximal end thereof, said threaded fasteners being threadedly received in said threaded apertures of said lug nuts, each of said lug nuts having a generally annular peripheral flange extending outwardly of said distal end of said lug nut generally parallel said longitudinal axis of said lug nut and a generally circular protuberance extending centrally from said distal end of said lug nut, said peripheral flange and said protuberance of each of said lug nuts forming a generally annular channel therebetween adapted for receiving a tool for rotating said lug nuts, said tool having a head having a generally annular lug engaging portion adapted for insertion in said channels of said lug nuts.

6. The trailer hitch locking system of claim 5, wherein each of said peripheral flanges of said lug nuts has a plurality of alternating wide and narrow portions adapted for engagement adapted for receiving alternating thick and thin portions of said lug engaging portion of said head of said tool.

7. The trailer hitch locking system of claim 1, further comprising a pair of cylindrical sleeves having open top and bottom ends and a lumen, each of said sleeves being positioned on an opposite side of said hitch receiving panel of said rear bumper with respect to said support members, said lumens of said sleeves being aligned with said apertures of said plate member, each of said sleeves being adapted for having a lug nut rotatably inserted in said sleeve.

8. The trailer hitch locking system of claim 7, wherein said top ends of each of said sleeves has an annular flange extending inwardly therefrom, said proximal ends of said lug nuts engaging said annular flanges of said sleeves.

9. The trailer hitch locking system of claim 8, wherein said proximal ends of each of said lug nuts tapers together towards said proximal end of said lug nut.

10. The trailer hitch locking system of claim 7, wherein a length of each of said sleeves is defined between said top and bottom ends thereof, a length of each of said lug nuts being defined between said proximal and distal ends thereof, wherein said length of each of said sleeves is greater than said length of each of said lug nuts.

11. The trailer hitch locking system of claim 1, additionally comprising, in combination:

a vehicle having a rear bumper;

said rear bumper having a generally planar hitch receiving panel and a hitch ball extending from said hitch receiving panel;

a trailer hitch having a ball housing and a ball lock coupled to said ball housing;

said ball housing having an opening for receiving said hitch ball therethrough;

said front side of said plate member being substantially straight;

said back side of said plate member having an arcuate shallow depression therein for permitting free movement of said ball lock of said trailer hitch as said trailer hitch pivots, said shallow depression extending between said ends of said plate member;

said ends of said plate member tapering together from said back side towards said front side of said plate member for permitting a foot to slide therealong for standing on said hitch receiving panel of said rear bumper;

said plate member having a pair of cylindrical support members extending downwardly therefrom for supporting said plate member over said ball hitch;

each of said support members having a lumen, said lumens of said support members being aligned with said apertures of said plate member, free ends of said support members resting on said hitch receiving panel of said rear bumper;

said hitch receiving panel of said rear bumper having a pair of holes therethrough, said apertures of said plate member being alignable with said holes of said rear bumper;

said pair of threaded fasteners extending through said apertures of said plate member, said lumens of said support members, and said holes of said rear bumper;

each of said threaded fasteners having a rounded top;

a pair of lug nuts threadedly coupled to said threaded fasteners;

each of said lug nuts having proximal and distal ends, a longitudinal axis extending between said proximal and distal ends, and a threaded aperture extending into said proximal end thereof, said threaded fasteners being threadedly received in said threaded apertures of said lug nuts;

each of said lug nuts having a generally annular peripheral flange extending outwardly of said distal end of said lug nut generally parallel said longitudinal axis of said lug nut and a generally circular protuberance extending centrally from said distal end of said lug nut, said peripheral flange and said protuberance of each of said lug nuts forming a generally annular channel therebetween;

each of said peripheral flanges of said lug nuts having a plurality of alternating wide and narrow portions;

a tool for rotating said lug nuts, said tool having a head having a generally annular lug engaging portion adapted for insertion in said channels of said lug nuts;

said lug engaging portion of said head of said tool having a plurality of alternating thick and thin portions corresponding to said narrow and wide portions of said peripheral flanges of said lug nuts;

a pair of cylindrical sleeves having open top and bottom ends and a lumen, each of said sleeves being positioned on an opposite side of said hitch receiving panel of said rear bumper with respect to said support members, said lumens of said sleeves being aligned with said apertures of said plate member, said lug nuts being rotatably inserted in said sleeves;

said top ends of each of said sleeves having an annular flange extending inwardly therefrom, said proximal ends of said lug nuts engaging said annular flanges of said sleeves;

said proximal ends of each of said lug nuts tapering together towards said proximal end of said lug nut;

a length of each of said sleeves being defined between said top and bottom ends thereof, a length of each of said lug nuts being defined between said proximal and distal ends thereof, wherein said length of each of said sleeves is greater than said length of each of said lug nuts; and wherein an outer diameter of the tool is smaller than said inner diameter of said lumens of said sleeves.

12. A trailer hitch locking system adapted for coupling to a rear bumper of a vehicle having a generally planar hitch receiving panel and a hitch ball extending from said hitch receiving panel, comprising:

a plate member having front and back sides and a pair of opposite ends, said plate member being positionable over a hitch ball coupled to a rear bumper of a vehicle;

said plate member having a pair of apertures extending therethrough, said apertures of said plate member being alignable with holes extending through a rear bumper of a vehicle;

a pair of fasteners extending through said apertures of said plate member and said holes of a rear bumper of a vehicle; and wherein each of said threaded fasteners comprises a threaded fastener, a pair of lug nuts being threadedly coupled to said threaded fasteners, each of said lug nuts having proximal and distal ends, a longitudinal axis extending between said proximal and distal ends, and a threaded aperture extending into said proximal end thereof, said threaded fasteners being threadedly received in said threaded apertures of said lug nuts, each of said lug nuts having a generally annular peripheral flange extending outwardly of said distal end of said lug nut generally parallel said longitudinal axis of said lug nut and a generally circular protuberance extending centrally from said distal end of said lug nut, said peripheral flange and said protuberance of each of said lug nuts forming a generally annular channel therebetween adapted for receiving a tool for rotating said lug nuts, said tool having a head having a generally annular lug engaging portion adapted for insertion in said channels of said lug nuts.

13. The trailer hitch locking system of claim 12, wherein said back side of said plate member has an arcuate shallow depression therein for permitting free movement of said ball lock of said trailer hitch as said trailer hitch pivots, said shallow depression extending between said ends of said plate member.

14. The trailer hitch locking system of claim 12, wherein said ends of said plate member taper together from said back side towards said front side of said plate member for permitting a foot to slide therealong for standing on a hitch receiving panel of said rear bumper.

15. The trailer hitch locking system of claim 12, wherein each of said fasteners has a rounded top.

16. The trailer hitch locking system of claim 12, wherein each of said peripheral flanges of said lug nuts has a plurality of alternating wide and narrow portions adapted for engagement adapted for receiving alternating thick and thin portions of said lug engaging portion of said head of said tool.

17. A trailer hitch locking system adapted for coupling to a rear bumper of a vehicle having a generally planar hitch receiving panel and a hitch ball extending from said hitch receiving panel, comprising:

a plate member having front and back sides and a pair of opposite ends, said plate member being positionable over a hitch ball coupled to a rear bumper of a vehicle;

said plate member having a pair of apertures extending therethrough, said apertures of said plate member being alignable with holes extending through a rear bumper of a vehicle;

a pair of fasteners extending through said apertures of said plate member and said holes of a rear bumper of a vehicle; and a pair of cylindrical sleeves having open top and bottom ends and a lumen, each of said sleeves being positioned on an opposite side of said hitch receiving panel of said rear bumper with respect to said support members, said lumens of said sleeves being aligned with said apertures of said plate member, each of said sleeves being adapted for having a lug nut rotatably inserted in said sleeve.

18. The trailer hitch locking system of claim 17, wherein said top ends of each of said sleeves has an annular flange extending inwardly therefrom, said proximal ends of said lug nuts engaging said annular flanges of said sleeves.

19. The trailer hitch locking system of claim 17, wherein a length of each of said sleeves is defined between said top and bottom ends thereof, a length of each of said lug nuts being defined between said proximal and distal ends thereof, wherein said length of each of said sleeves is greater than said length of each of said lug nuts.

* * * * *